M. M. BEEMAN & J. F. KITCHEN.
MACHINE FOR MAKING WIRE GARMENT STAYS.
APPLICATION FILED APR. 15, 1910.

1,042,756.

Patented Oct. 29, 1912.
8 SHEETS—SHEET 1.

WITNESSES

INVENTORS

M. M. BEEMAN & J. F. KITCHEN.
MACHINE FOR MAKING WIRE GARMENT STAYS.
APPLICATION FILED APR. 15, 1910.

1,042,756.

Patented Oct. 29, 1912.

WITNESSES

INVENTORS

M. M. BEEMAN & J. F. KITCHEN.
MACHINE FOR MAKING WIRE GARMENT STAYS.
APPLICATION FILED APR. 15, 1910.

1,042,756.

Patented Oct. 29, 1912.

WITNESSES

INVENTORS

M. M. BEEMAN & J. F. KITCHEN.
MACHINE FOR MAKING WIRE GARMENT STAYS.
APPLICATION FILED APR. 15, 1910.

1,042,756.

Patented Oct. 29, 1912.

M. M. BEEMAN & J. F. KITCHEN.
MACHINE FOR MAKING WIRE GARMENT STAYS.
APPLICATION FILED APR. 15, 1910.

1,042,756.

Patented Oct. 29, 1912.

M. M. BEEMAN & J. F. KITCHEN.
MACHINE FOR MAKING WIRE GARMENT STAYS.
APPLICATION FILED APR. 15, 1910.
1,042,756.
Patented Oct. 29, 1912.
8 SHEETS—SHEET 7.
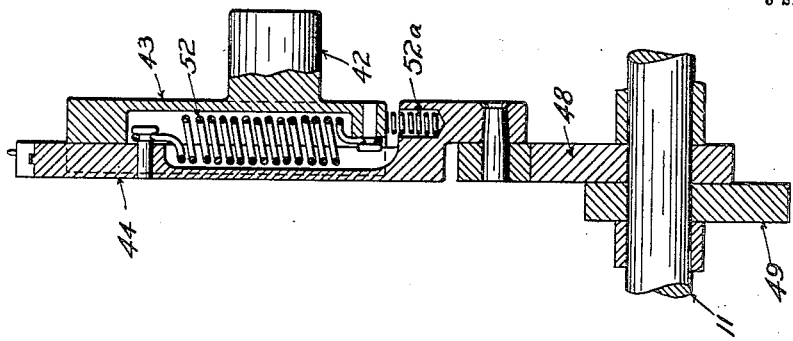
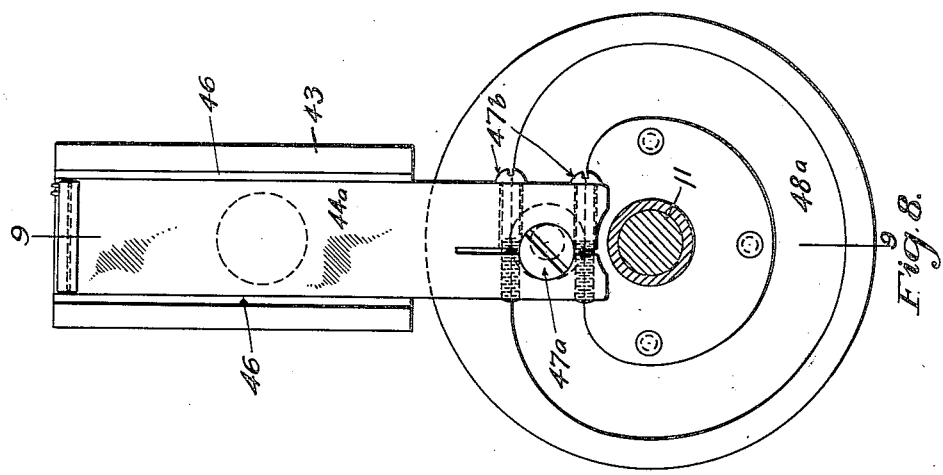
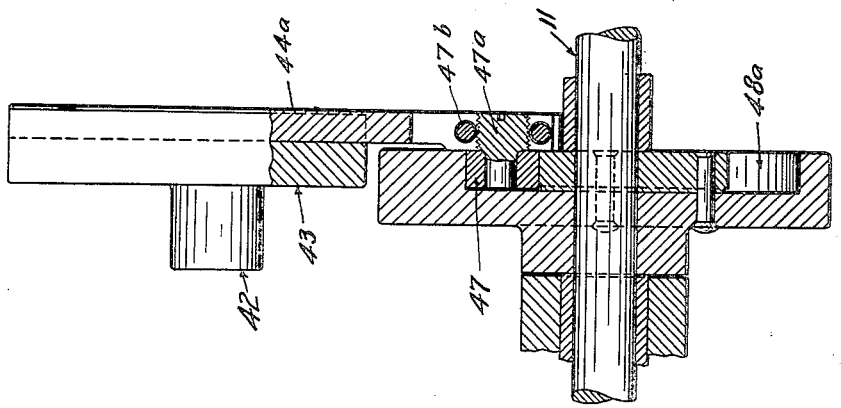
WITNESSES
INVENTOR M. M. BEEMAN & J. F. KITCHEN.
MACHINE FOR MAKING WIRE GARMENT STAYS.
APPLICATION FILED APR. 15, 1910.
1,042,756.
Patented Oct. 29, 1912.
8 SHEETS—SHEET 8.
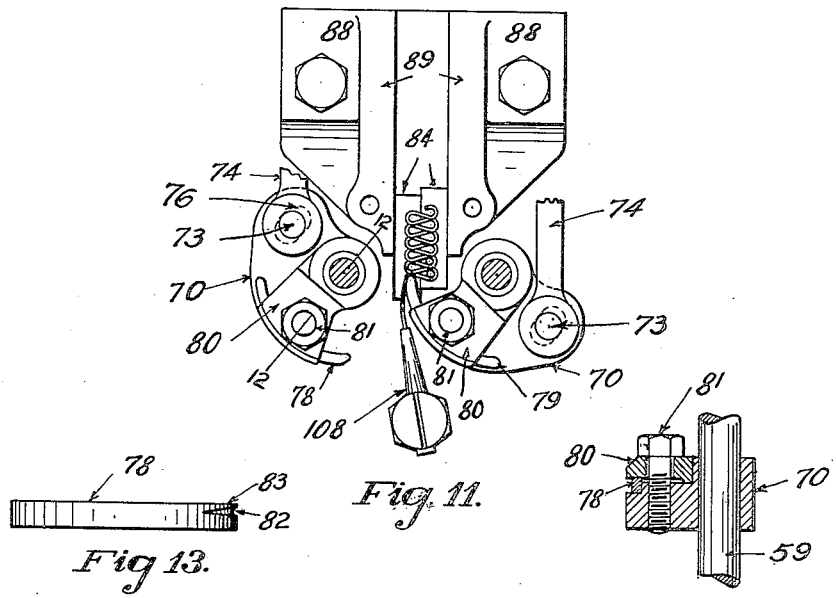
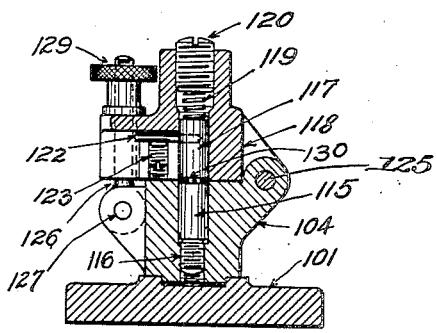
WITNESSES
INVENTORS

UNITED STATES PATENT OFFICE.

MARCUS M. BEEMAN AND JOHN F. KITCHEN, OF MEADVILLE, PENNSYLVANIA, ASSIGNORS TO THE SPIRELLA COMPANY, OF MEADVILLE, PENNSYLVANIA, A CORPORATION OF PENNSYLVANIA.

MACHINE FOR MAKING WIRE GARMENT-STAYS.

1,042,756.  Specification of Letters Patent.  Patented Oct. 29, 1912.

Application filed April 15, 1910. Serial No. 555,668.

*To all whom it may concern:*

Be it known that we, MARCUS M. BEEMAN and JOHN F. KITCHEN, residents of Meadville, in the county of Crawford and State of Pennsylvania, have invented a new and useful Improvement in Machines for Making Wire Garment-Stays, of which the following is a specification.

This invention relates to wire bending machines, and more particularly to machines for bending wire back and forth into successive loops disposed oppositely and side by side with adjacent loops slightly overlapping and designed particularly for corset stays, such as shown in Patent No. 507,875, granted October 31, 1893, to Marcus M. Beeman, said stay being also preferably concaved transversely in the act of formation.

The object of this invention is to improve machines of the character above named in various features in order to render the same simpler and stronger in construction, more efficient and durable in operation, less liable to wear and get out of adjustment, and to occupy less space than prior machines for a similar purpose.

The specific improvements include the construction, combination and arrangement of parts hereinafter described and claimed.

In the accompanying drawings, Figure 1 is a side elevation of the improved machine; Fig. 2 is in part a plan view and in part a horizontal section taken at the level of the pin blocks; Fig. 3 is a rear end view of the machine with the reel and its operating devices omitted; Fig. 4 is a central vertical section through the machine; Fig. 5 is a vertical transverse section on the line 5—5 of Fig. 1; Fig. 6 is a horizontal section on the line 6—6, Fig. 5; Fig. 7 is a rear elevation of the reeling mechanism; Fig. 8 is a side elevation of a modified form of cam for operating the pin carriers; Fig. 9 is vertical section thereof on the line 9—9, Fig. 8; Fig. 10 is a detail sectional view showing a modification of the spring arrangement for lowering the pin carriers; Fig. 11 is a detail plan view of the bending devices and pin blocks; Fig. 12 is a section on the line 12—12, Fig. 11; Fig. 13 is an edge view of one of the bending fingers; Fig. 14 is a plan view of the same; Fig. 15 is a plan view of the pin blocks; Fig. 16 is a cross section through the tension device and bracket; Fig. 17 is an end view of a pin block; and Fig. 18 is a vertical longitudinal section through the same.

The machine is provided with a suitable base 1 upon which are erected the necessary frames and standards carrying the operative parts of the machine. These comprise a main frame 2 bolted or otherwise secured to the base plate near the forward end, a pair of separate shaft bearings 3 secured to the base plate immediately to the rear of the main frame, and a reel frame 4 secured to the base plate near its rear end.

The main frame 2 is preferably a casting comprising side plates or walls 5, a bottom 6 receiving the bolts for securing the said frame to the base plate, a rear wall 7 provided with a rearward extension 8, and a top plate or wall 9. The side plates or walls 5 of this main frame are provided with suitable bearings 10 for the main shaft 11. The latter extends at both ends beyond the side walls of the main frame, and at one end carries the fast and loose pulleys 12 and 13, by means of which the machine is driven. On its opposite end said shaft is provided with the hand wheel 14 for turning said shaft by hand, and which also serves as a fly wheel, and inside of said hand wheel said shaft is provided with a gear wheel 15, which meshes with a similar gear wheel 16 on a counter shaft 17 mounted in the bearings 3. The latter shaft is provided with a pair of bevel gears 18 and 19 respectively, the former of which meshes with a combined bevel and spur gear 20, while the latter meshes with a bevel gear 21. The bevel gears 20 and 21 are respectively slidably keyed to vertical shafts 22 and 23, which at their upper ends are respectively provided with disks 24 and 25, provided respectively with the wrist pins 26 and 27 for operating the oscillating benders, as will hereinafter appear.

The shafts 22 and 23 are mounted in bearings in the rearward projection 8 of the main frame 2, and other bearings in projections 30 on the side plates 31 and 32 respectively. These side plates are mounted on the side walls 5 of the main frame 2, the inner face of said side plates and outer faces of the side walls of the main frame being provided with grooves to receive the guide strips or keys 33, which permit vertical adjustment of the side plates on the main frame but prevent relative forward and rearward movement of said parts. The side plates are provided with vertical slots 34 receiving cap screws or stud bolts 35 projecting from the side walls of the main frame. The side plates are adjusted vertically by screws 37 entering threaded openings in the lower edges of said side plates and provided with reduced portions 38 seated between lugs 39 on the outer faces of the side walls of the main frame. By turning these screws the side plates are adjusted up and down as will be readily apparent, for the purpose of vertically adjusting the benders which are carried by said side plates, as will hereinafter appear.

The side walls of the main frame are provided directly above the main shaft with bearings for the trunnions 42 of oppositely arranged rocker guides 43 for the reciprocating pin carriers. The rocker guides 43 are grooved on their meeting faces as shown in Fig. 6, and mounted in said grooved portions to slide vertically are the pin block carriers 44 and 45 respectively. Wearing strips 46 are interposed between the edges of the carriers and the grooves in guides 43. Each pin carrier at its lower end is provided with a roller 47, which rollers run respectively on the faces of cams 48 and 49 on the main shaft 11. These cams are oppositely arranged so that they impart vertical reciprocating movement alternately to the two pin carriers 44 and 45. The guides 43 and the pin carriers 44 and 45 respectively are provided on their meeting or contact side faces with vertical grooves forming recesses for containing the spiral springs 52 having their upper ends secured to the pin carriers and their lower ends secured at 54 to the guides, said springs being in tension and serving to hold the pin carriers in contact with cams which actuate them.

Figs. 8 and 9 illustrate a modification wherein in lieu of the open cams of Fig. 5 there is shown a closed cam 48ª having a cam groove to receive the roller 47 on the pin carrier 44ª, said roller being carried on an eccentric and adjustable stud 47ª having a threaded connection with the split lower end of the pin carrier, and being clamped thereon by screws 47ᵇ.

Fig. 10 shows a modification wherein there is an auxiliary compression spring 52ª between the lower end of the guide 43 and the pin block carrier, to assist the spring 52 in lowering the pin block carrier and prevent the same from being held up by the friction of the wire bent around the pins.

Figure 1:
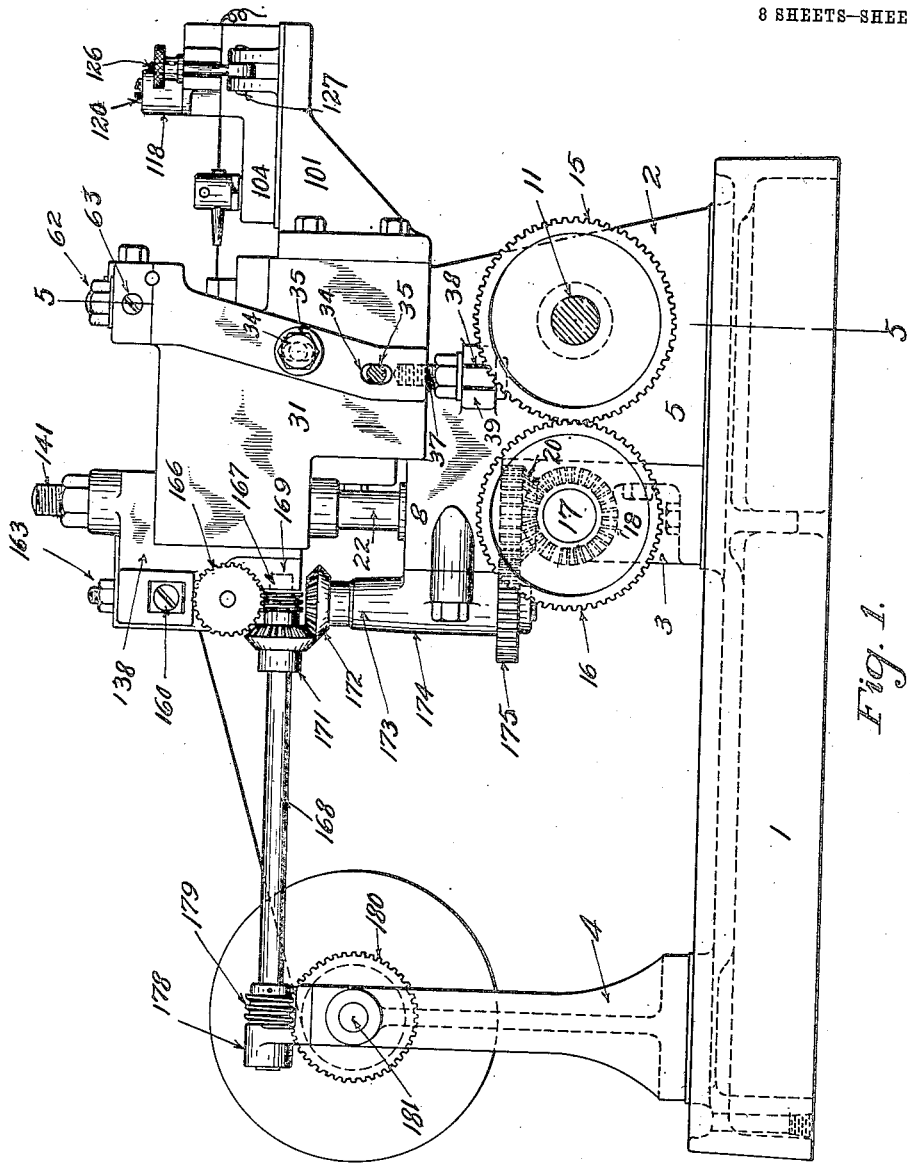
Figure 2:
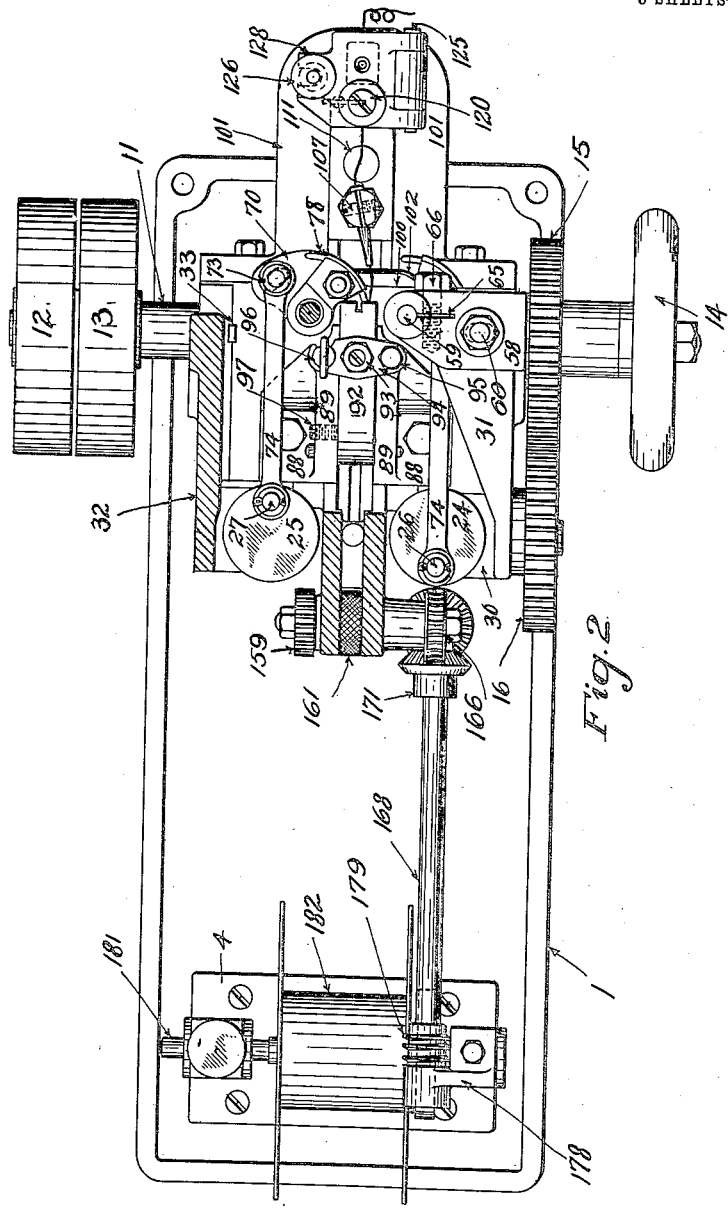
Figure 3:
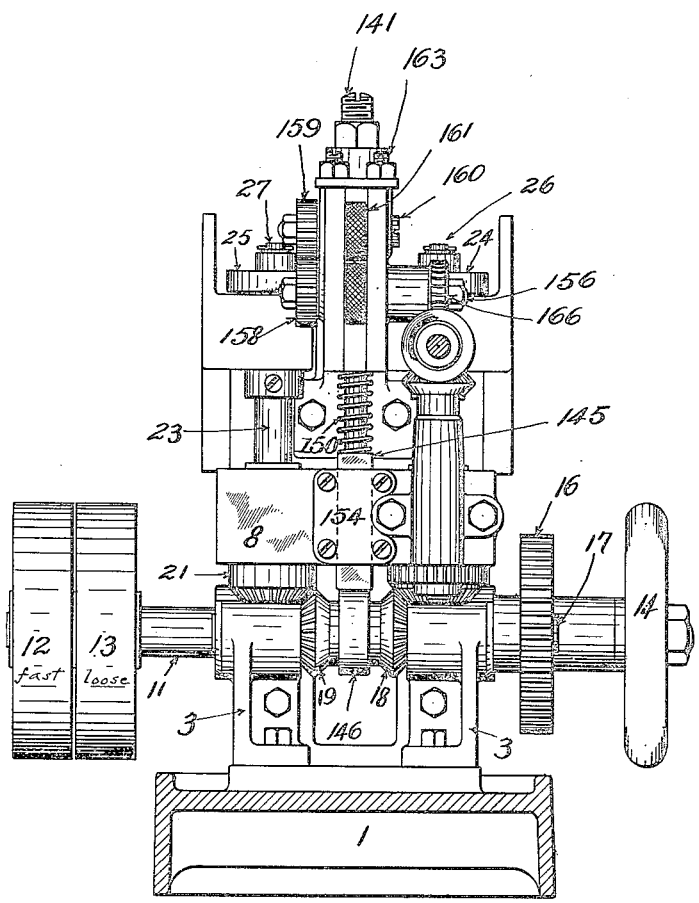

Secured to the top of each of the side plates 31 and 32 is a block or carrier 58 for the pivot members 59 for an oscillating bender. The means for securing these blocks or pivot carriers to the side plates comprises a stud 60 passing through an elongated opening 61 in the block carrier and receiving at its upper end a clamping nut 62. The opening 61 allows for lateral or sidewise adjustment (relative to the longitudinal center of machine) of the carriers 58 and of the benders carried thereby. A screw 63 forms an adjustable stop to limit the outward movement of the blocks or pivot carriers 58. A spring 64 is interposed between the securing stud 60 and the block on the inner side and serves to move said block outwardly when the clamping nut 62 is released and the screw 63 slackened. The block 58 adjacent to the hole for receiving the pivot 59 is slotted, as indicated at 65 and a clamping tap bolt 66 enters said block and serves to contract the split portion tightly against the pivot bolt 59 to hold the latter in position. The pivot member 59 at its lower end is provided with a collar 68, and above said collar has mounted thereon to oscillate the bending finger head 70 and the plate 71. Mounted in alining holes in a projection on the finger head and the end of plate 71 is a wrist pin 73 for receiving the forward end of link 74. There are two links 74, whose rear ends are connected respectively to the wrist pins 26 and 27 of shafts 22 and 23. The holes in the bender heads receiving the wrist pins 73 are arc shaped slots, as indicated at 76, Fig. 11, in order to allow the heads 70 to be adjusted angularly about the pivots 59 in order to vary the extent to which the bending fingers may swing inwardly around and past the bender pins. Each of the heads 70 carries a bending finger, marked 78 and 79 respectively, said fingers being clamped to the head by means of a clamping plate 80 and bolt 81. The bending fingers 78 and 79 are provided on their ends with inclined V- or U-shaped grooves 82 for guiding the wire, the upper walls of said grooves forming helical lips 83 for carrying a loop as it is being formed underneath a previously formed loop. The wrist pins 26 and 27 for actuating the two benders are reversely arranged with reference to their shafts, as shown in Fig. 2, in order to oscillate the two benders alternately.

The bending fingers described coöperate with pins carried by the carriers 44 and 45, said pins preferably being removable and renewable and secured in removable and renewable blocks 84 secured to said carriers. Two pins, 85 and 86, one in advance of the other, are carried by each carrier.

Secured to the top wall 9 of the main frame 2 is a block 88 which is cut away at its forward end to allow the pin carriers 44 and 45 to reciprocate through the same, and which has side walls 89 receiving between the same a slightly channel shaped guide 90, the top surface of which is on substantially the level of the top faces of the pin blocks when in elevated position. Pivoted between the side walls of the block 88, at 91, is a presser foot 92 whose forward end lies directly above the pin blocks and is notched to clear the pins 85 and 86. This presser foot is clamped down by means of a screw 93 carried in a bridge piece 94, which is pivoted at 95 to one of the side walls of the block 88 and at its opposite end is provided with an open hole for receiving the winged bolt or nut 96. The guide 90 is held in position by means of a binding screw 97 passing through one of the side walls of the block 88.

Figure 4:
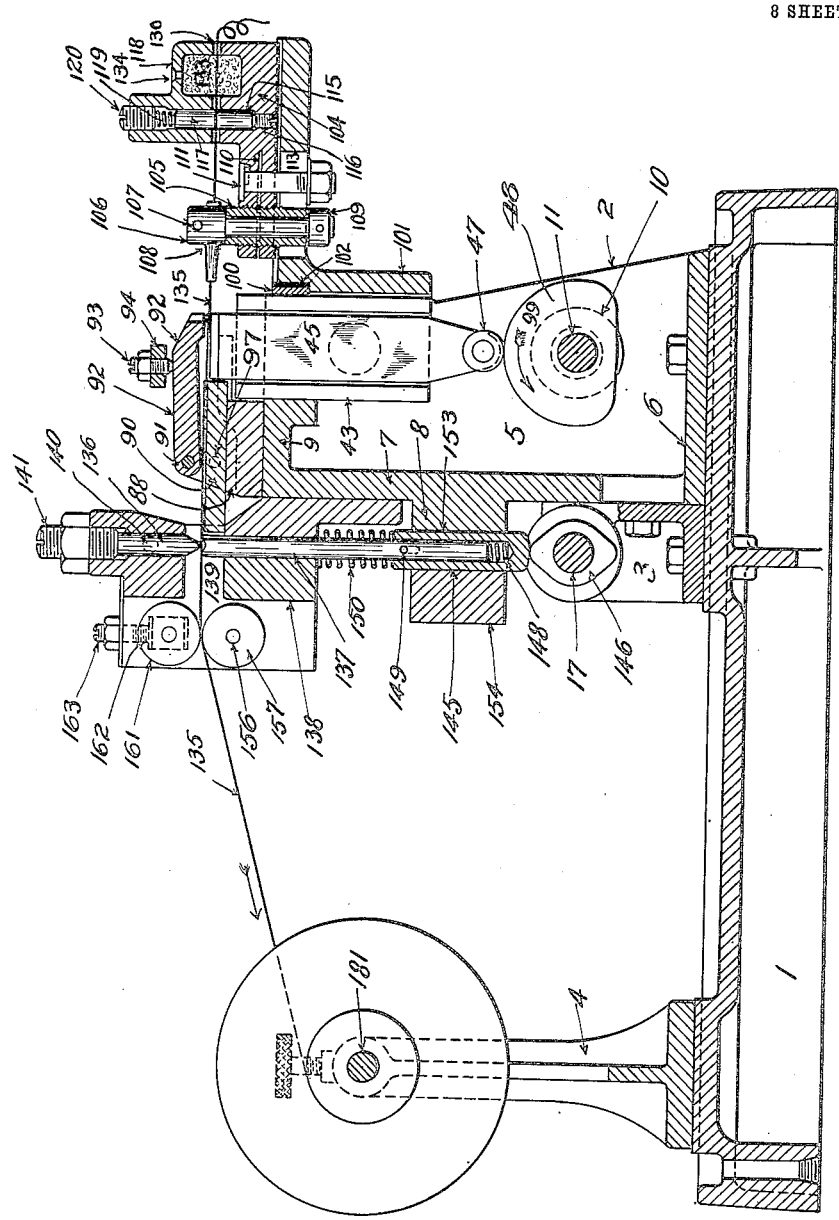
Figure 5:
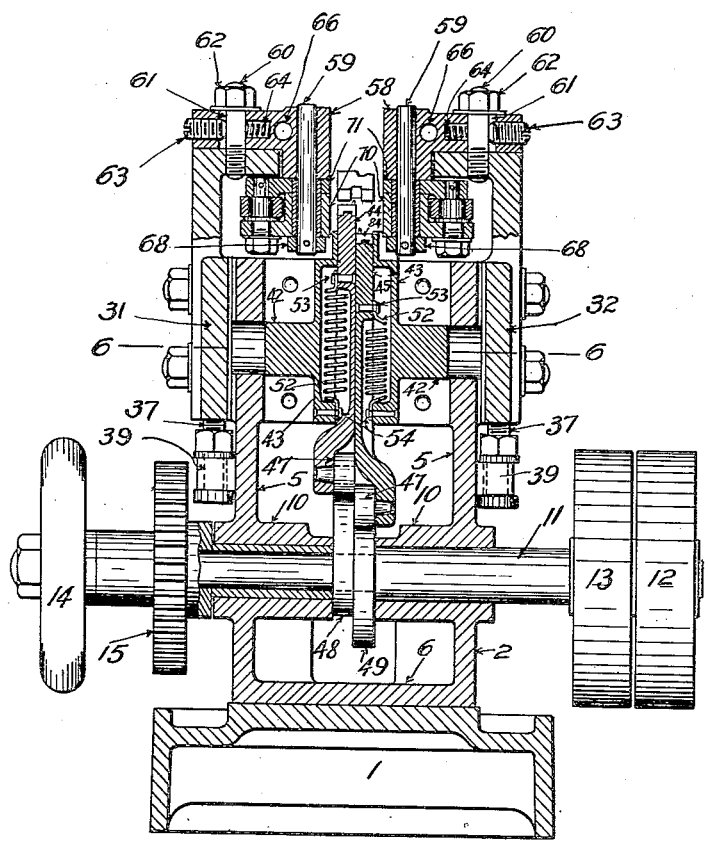
Figure 6:
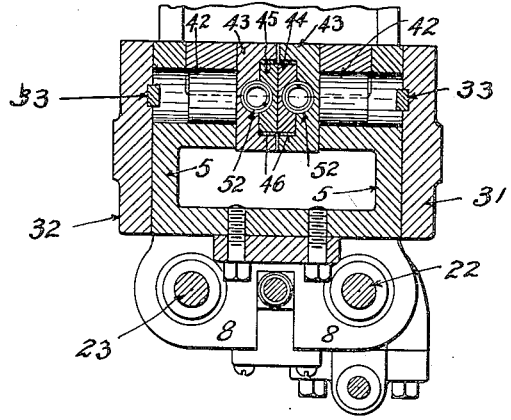
Figure 7:
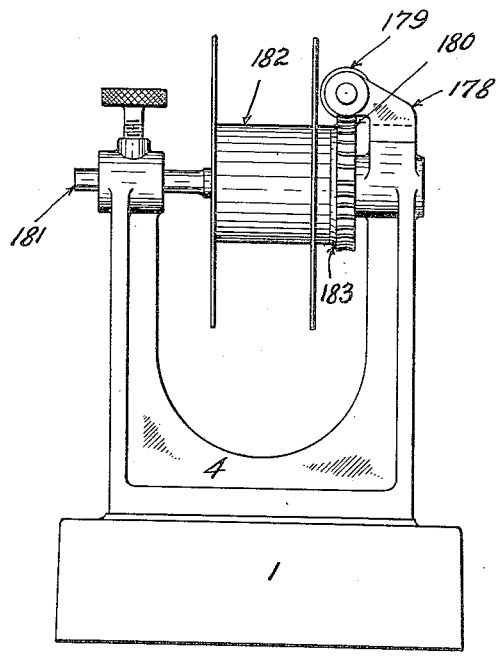

In the operation of the machine, the pin carriers 44 and 45 are alternately raised by the cams 48 and 49 and the bending fingers 78 and 79 are alternately swung inwardly across the pin blocks by means of the reversely arranged cranks on shafts 22 and 23, as will be readily understood. The main shaft rotates in the direction of the arrow 99, Fig. 4, so that the cams 48 and 49, acting against the rollers 47 on the lower ends of the pin carriers, rock the guides 43 in a direction to carry their upper ends forwardly. This occurs whenever the respective pin carriers are being raised by the cams to the position of engagement with the wire and are free from the pressure exerted by the bending fingers. When a bending finger swings inwardly to carry the wire across and over the pin block, the pressure exerted thereby causes the upper end of the pin carrier to move rearwardly, or in other words, causes the guides 43 to oscillate in the reverse direction from the movement thereof caused by the cams. The reverse or rearward oscillation of the pin carriers is limited by the guides 43 contacting with the edge of the top wall on the main frame, as shown in Fig. 4. This forward and back movement of the pins due to the oscillation of the guides 43 produces a feeding movement of the material through the machine. The extent of this feeding movement is determined by the amount of oscillation allowed the guides 43. As stated, the rearward oscillation is limited by contact with the top wall of the frame. The forward oscillation is limited by a stop plate 100 secured to the rear face of a bracket 101 secured to the forward side of the main frame. The position of the stop plate 100 is adjusted by means of interchangeable liners or shims 102 placed between the same and the bracket 101. By this means the extent to which the guides 43 of the pin carriers can oscillate forwardly is regulated, thereby regulating the feeding movement of the material through the machine.

The bracket 101 carries the tension and wire swabbing devices which are as follows: Mounted on said bracket is a casting or block 104, seated in a groove in the bracket, as indicated in Fig. 4, so as to accurately position the same on said bracket. This block at its forward end is provided with a threaded opening for receiving a threaded bearing sleeve 105, in which is mounted for oscillatory movement the vertical shaft 106 which at its upper end is split and has clamped therein by means of clamping screw 107 the wire guide 108. The shaft 106 has fastened to its lower end a collar 109 which holds it in the bearing sleeve 105. By turning the bearing sleeve 105, the guide 108 can be adjusted vertically, as will be readily apparent. The casting or block 104 is provided with a horizontal slit 110 and is secured to the bracket 101 by a clamping bolt 111 passing through an opening in said block or casting and through a slot 113 in the bracket. When this clamping bolt is tightened it draws together the bifurcated portion of the block or casting 104, as will be apparent, and thereby locks the bearing sleeve 105 against rotation.

The outer end of the block or casting 104 is provided with a vertical opening in which is mounted the lower tension block 115, which can be adjusted vertically by screw 116 entering from the bottom of said block. Coöperating with this tension member 115 is an upper tension member 117 mounted in a vertical opening in the cap 118, and yieldingly held by means of a spring 119 whose tension may be adjusted by screw 120, said spring and screw being located in a vertical tapped opening in said cap 118. A pin 122 projects from the upper tension member 117 and is arranged to move vertically in a slot in cap 118. Downward movement of said pin and consequently of the tension block 117 is limited by an adjusting screw 123. The cap 118 is pivotally secured at 125 to the block or casting 104 and is held down by means of a swinging bolt 126 mounted on horizontal pivot 127 between suitable ears or projections on the block 104 and arranged to swing between ears 128 on the cap and having its upper end threaded to receive the milled nut 129 by means of which said cap may be clamped down tightly against the block 104.

The cap and block are provided with registering grooves forming the opening 130 through which the wire passes. Said block and cap are also provided with registering recesses for receiving felt or other fibrous material 133, which can be kept oiled or lubricated through an oil hole 134, and which serves to oil and clean the wire. The wire 135 is shown as passing between the felt swabs 133, thence between tension blocks 115 and 117, thence through the oscillatory or vibratory guide 108 to the bending blocks and fingers.

The bent wire fabric after leaving the guide 90 passes through a suitable hammering or compression device to partly take out the tendency to curl or twist. This hammering device comprises an upper stationary hammer or anvil 136 and a lower movable plunger or hammer 137. These hammers or compression devices are mounted in alining openings in a casting 138 secured to the rear wall of the main frame 2 and provided with an opening 139 through which the wire fabric passes. The anvils or hammers project into said opening 139. The top hammer or anvil is held against rotation by means of a set screw 140 engaging with a groove in, or a flat side of said hammer, and is backed at its upper end by the adjusting screw 141. It is provided at its lower end with a rounded face coöperating with a concave face on the lower hammer or plunger 137. The plunger 137 has its lower end entering the socket or foot piece 145 which is acted upon by a cam 146 on the counter shaft 17. A compression spring 148 of suitable stiffness is interposed as a safety device between the lower end of plunger 137 and said socket or foot, to prevent injury to the mechanism when the upper hammer is set down too far. A pin 149 passing through the plunger 137, extends into slots in said sleeve or foot, prevents rotary movement of the plunger in said sleeve, and maintains the proper working length of the lower compressing member. A spiral spring 150 surrounds the plunger and holds the socket or foot 145 against the cam. The socket or foot 145 is rectangular in cross section and arranged to reciprocate in a slot 153 in the rearward projection 8 on the main frame, the outer end of said slot being closed by the cap 154.

Mounted in the casting 138 to the rear of the hammering devices is a horizontal shaft 156 carrying a bottom feed roller 157. This shaft at one end is provided with a spur gear 158 meshing with a similar gear 159 on another shaft 160 carrying the top feed roller 161. The top feed roller is yieldingly pressed against the bottom feed roller by means of helical springs 162 backed by adjusting screws 163, said springs acting upon the bearings of the shaft 160, which bearings are mounted for vertical movement in the casting 138. The shaft 156 carries a worm wheel 166 which is engaged by a worm 167 on horizontal shaft 168 whose end is mounted in a bracket 169 forming a part of the casting 138. The shaft 168 has secured thereto a bevel gear 171 meshing with a similar gear 172 on a vertical shaft 173 mounted in a bearing 174 secured to the rear face of the projection 8 on the main frame 2, and at its lower end carrying a gear 175 meshing with the combined spur and bevel gear 20 on shaft 22. By means of this train of gearing the feed rollers 157 and 161 are given a slow rotary movement to draw the completed fabric through the machine.

The shaft 168 has its rear end mounted in a bearing 178 secured to the reel stand 4, and is provided with a worm 179 meshing with a worm wheel 180 on a spindle 181 mounted in the reel stand, said spindle having a frictional driving engagement with the side face of the reel 182 by means of an interposed friction disk 183 so as to impart a yielding rotary motion to the reel and wind up the completed fabric.

The operation of the machine will be understood from the foregoing description.

The power is applied to the main shaft 11, and through the trains of gearing described movement is imparted to the counter shaft 17, vertical crank shafts 22 and 23, feed rollers 157 and 161, and reel 182. The pin block carriers 44 and 45 are alternately lifted and depressed, and the oscillating benders 78 and 79 are alternately swung around the front end of the pin blocks. We will suppose that the pin block 44 is elevated, and the wire looped between the two pins thereon. The finger 78 swings inwardly carrying the wire across the central line of the machine and bending it around the forward pin on block 44. The pressure caused thereby causes the upper end of said block to oscillate to the rear until stopped by contact with the top wall of the main frame. The pin carrier 45 now ascends and catches the wire between the two pins thereon. The finger 78 then recedes and the pin carrier 44 moves downwardly. The bending finger 79 then swings inwardly catching the wire in its groove and carries it in the reverse direction across the central line of the machine and around the front pin on the pin carrier 45, forming a loop and pushing the wire underneath the previously formed loop on the opposite side. The pressure exerted on the pin around which the loop is formed causes the upper end of pin carrier 45 to oscillate to the rear. The pin carrier 44 again moves upwardly, and as it is relieved of all pressure at its upper end the friction on the cam 46 acting against its lower end causes its upper end to oscillate forwardly until stopped by the stop plate 100, bringing the two pins on said carrier in position to catch the crossing portion of the wire between the same. The pin block 45 now descends and the finger 78 again swings inwardly and repeat the operation previously described. The fabric is formed between the presser foot on the top and the vertically moving pin carriers on the bottom. The fabric as formed passes along the grooved guide 90 and between the hammering devices 136 and 137 and thence between the feed rollers 157 and 161, and is finally wound upon the reel 182.

The machine described is of very compact construction and occupies a minimum amount of space. The pin carriers are actuated directly from below, so that they cannot yield or spring as is the case with oscillating levers, giving a greater pressure with a less expenditure of power and are less liable to wear. The oscillating finger carriers are adjusted laterally so as to vary the distance to which the fingers can swing across the central line of the machine and are also adjusted vertically in order to vary the position of said fingers with reference to the top face of the pin blocks in order to impart the necessary concavity to the fabric. Vertical adjustment of the finger carriers is effected by moving the side plate up or down, through the medium of the adjusting screws 37 after loosening the stud bolts 35, which are to be tightened after such adjustment is effected. This is accomplished without changing the relative positions of the parts, thereby avoiding any strain upon the wrist-pins and connecting rods.

What we claim is:

1. In a wire bending machine, the combination of pin carriers mounted to reciprocate vertically and oscillate longitudinally, cams arranged to alternately reciprocate said carriers and oscillate the same horizontally, oscillating fingers arranged to move across the faces of said carriers and bend the wire around the pins on said carriers and thereby retract the carriers, and mechanism for alternately oscillating said fingers.

2. In a wire bending machine, the combination of pin carriers mounted to reciprocate vertically and oscillate horizontally, cams arranged to alternately reciprocate said carriers and oscillate the same forwardly and being formed to permit recession of said carriers when in full elevated position, benders arranged to move across the faces of said carriers and bend the wire around the pins thereon and thereby pushing the carriers backwardly, and mechanism for alternately operating said benders.

3. In a wire bending machine, the combination of pin carriers mounted to reciprocate vertically and oscillate horizontally, a presser foot above said carriers and arranged to have the wire clamped against the same by said carriers, oscillating fingers arranged to move across the ends of said carriers and bend the wire around the pins thereon, thereby pushing the carriers backwardly, and mechanism for alternately oscillating said fingers and alternately reciprocating said carriers.

4. In a wire bending machine, the combination of pin carriers mounted to reciprocate vertically and oscillate horizontally, cams arranged to reciprocate said carriers and moving in a direction to oscillate the upper ends of said carriers forwardly when in idle position, a presser foot coöperating with said carriers, and oscillating benders arranged to move across the faces of said carriers and bend the wire around the pins thereon and thereby pushing the upper ends of said carriers backwardly.

5. In a wire bending machine, the combination of pin carriers mounted to reciprocate vertically and oscillate horizontally, a single cam for each of said carriers arranged to both reciprocate the same and to oscillate the upper end thereof forwardly when in idle position, and means for bending the wire around the pins on said carriers alternately and thereby pushing their upper ends rearwardly.

6. In a wire bending machine, the combination of alternately reciprocating pin carriers, alternately oscillating wire bending fingers, grooves on the faces of said fingers providing inclined lips for engaging the wire and bending the same around the pins and thereby carrying the same under a previously formed loop.

7. In a wire bending machine, the combination of alternately reciprocating pin carriers, alternately oscillating wire bending fingers provided with inclined grooves for engaging the wire and bending the same around said pins, and a wire guide, said wire guide and the inclined grooves in the fingers being in a plane below the tops of the pin carriers when in elevated position.

8. In a wire bending machine, the combination of pin carriers, vertical guides in which said carriers are mounted to reciprocate and reversely disposed cams each having operative engagement with one of said carriers.

9. In a wire bending machine, the combination of oscillatory members provided with vertical guides, reciprocating pin carriers mounted in said guides, and reversely disposed cams each having operative engagement with one of said reciprocating carriers.

10. In a wire bending machine, the combination of oscillatory members provided with guides, pin carriers arranged to reciprocate in said guides, cams engaging said carriers and arranged to reciprocate the same alternately, and springs arranged to retract said carriers.

11. In a wire bending machine, the combination of oscillatory members provided with vertical guides, pin carriers reciprocating in said guides, mechanism for reciprocating said carriers alternately, said oscillatory members and guides being provided with alined recesses, and springs in said recesses and acting at one end against said oscillatory members and at the other end against said reciprocating carriers.

12. In a wire bending machine, the combination of oscillatory benders, vertically reciprocating pin carriers, and a cam shaft and cams located directly below said pin carriers and arranged to reciprocate the same alternately.

13. In a wire bending machine, the combination of pin carriers, mechanism for raising and lowering the same alternately, oscillatory benders, vertical crank shafts, and rods connecting said benders and crank shafts.

14. In a wire bending machine, the combination of pin carriers, mechanism for raising and lowering the same, oscillatory benders, means for adjusting said benders vertically, vertical crank shafts, and connecting rods attached to wrist pins on said benders and crank shafts respectively.

15. In a wire bending machine, the combination of pin carriers, mechanism for alternately raising and lowering the same, vertically adjustable frame members, bender heads mounted thereon to oscillate, means for adjusting said bender heads laterally on said supports, and mechanism for alternately oscillating said bender heads.

16. In a wire bending machine, the combination of pin carriers, mechanism for alternately raising and lowering the same, oscillatory benders mounted for adjustment vertically and laterally, vertical crank shafts, and connecting rods connected to wrist pins on said benders and crank shafts.

17. In a wire bending machine, the combination of pin carriers, mechanism for alternately raising and lowering the same, bending fingers, oscillatory carriers therefor, a vertical crank shaft, a connecting rod attached at one end to a wrist pin on said crank shaft and at its opposite end to a wrist pin having an adjustable connection to an oscillatory finger carrier.

18. In a wire bending machine, the combination of pin carriers, mechanism for alternately raising and lowering the same, oscillatory benders, supports for said benders, said supports having vertical adjustment on said frame, and mechanism for alternately oscillating said benders.

19. In a wire bending machine, the combination of pin carriers, oscillatory benders, vertical crank shafts for oscillating said benders, a main shaft, cams thereon arranged to actuate said pin carriers alternately, a counter shaft geared to said main shaft, and gears directly connecting said counter shaft and said vertical crank shafts.

20. In a wire bending machine, the combination of pin carriers, oscillatory benders, compressing devices, a main shaft, cams thereon arranged to actuate said pin carriers alternately, a counter shaft directly geared to said main shaft, bender oscillating devices actuated from said counter shaft, and compression operating devices actuated from said counter shaft.

21. In a wire bending machine, the combination of pin carriers, oscillatory benders, a compressing device, a pair of parallel shafts geared directly together, cams on one of said shafts arranged to actuate said pin carriers, a cam on the other shaft arranged to actuate the compressing device, and bender oscillating devices actuated from one of said shafts.

22. In a wire bending machine, the combination of vertically reciprocating and horizontally oscillating pin carriers, mechanism for alternately reciprocating said carriers and oscillating the same when idle, a stop against which said carriers are oscillated, and oscillating wire benders coöperating with said pin carriers.

23. In a wire bending machine, the combination of bending devices, a wire guide, an oscillating carrier therefor, an adjustable bearing for said carrier, a split support for said bearing, and clamping means arranged to lock said adjustable bearing in said support.

24. In a wire bending machine, a wire guide, an oscillatory shaft therefor, a threaded bearing for said oscillatory shaft, a split block in which said bearing is threaded, a supporting frame, and a bolt arranged to secure said block to said frame and simultaneously clamp the threaded bearing therein.

25. A tension device for wire bending machines comprising a base, a vertically adjustable tension block therein, a cap hinged to said base, and a vertically adjustable spring pressed tension block therein.

In testimony whereof, we have hereunto set our hands.

M. M. BEEMAN.
JOHN F. KITCHEN.

Witnesses:
J. H. PARDEE,
SARA M. JOHNSON.